United States Patent [19]
Courtney et al.

[11] Patent Number: 5,519,786
[45] Date of Patent: May 21, 1996

[54] METHOD AND APPARATUS FOR IMPLEMENTING A WEIGHTED VOTING SCHEME FOR MULTIPLE OPTICAL CHARACTER RECOGNITION SYSTEMS

[75] Inventors: William F. Courtney, Long Beach; M'Lissa L. Smith, Los Angeles, both of Calif.

[73] Assignee: TRW Inc., Redondo Beach, Calif.

[21] Appl. No.: 287,999

[22] Filed: Aug. 9, 1994

[51] Int. Cl.⁶ ................................................ G06K 9/64
[52] U.S. Cl. ........................ 382/159; 382/304; 382/310
[58] Field of Search ............................... 382/57, 62, 155, 382/159, 161, 309, 318, 304, 310

[56] References Cited

U.S. PATENT DOCUMENTS

| | | | |
|---|---|---|---|
| 4,032,887 | 6/1977 | Roberts | 382/57 |
| 4,760,604 | 7/1988 | Cooper et al. | 382/15 |
| 4,876,735 | 10/1989 | Martin et al. | 382/57 |
| 4,958,375 | 9/1990 | Reilly et al. | 382/14 |
| 5,054,093 | 10/1991 | Cooper et al. | 382/14 |
| 5,257,323 | 10/1993 | Melen et al. | 382/57 |
| 5,337,371 | 8/1994 | Sato et al. | 382/14 |

*Primary Examiner*—Leo Boudreau
*Assistant Examiner*—Andrew W. Johns
*Attorney, Agent, or Firm*—G. Gregory Schivley; R. W. Keiler

[57] ABSTRACT

A method and apparatus for implementing a weighted voting scheme for reading and accurately recognizing characters in a scanned image. A plurality of optical character recognition processors scan the image and read the same image characters. Each OCR processor outputs a reported character corresponding to each character read. For a particular character read, the characters reported by each OCR processor are grouped into a set of character candidates. For each character candidate, a weight is generated in accordance with a confusion matrix which stores probabilities of a particular OCR to identify characters accurately. The weights are then compared to determine which character candidate to output.

24 Claims, 2 Drawing Sheets

METHOD AND APPARATUS FOR IMPLEMENTING A WEIGHTED VOTING SCHEME FOR MULTIPLE OPTICAL CHARACTER RECOGNITION SYSTEMS

BACKGROUND OF THE INVENTION

1. Field of the Invention

This invention relates generally to an apparatus and method for implementing weighted voting schemes for multiple optical character recognition processors. More particularly, this invention relates to implementing a probabilistic approach to determining the actual characters read when multiple optical character recognition processors scan identical images.

2. Discussion

Oftentimes it is both useful and necessary to transform data appearing in a hard-copy format to a format readable by and useful to computers. One common example is of text appearing on printed or published pages. A second, increasingly common example as electronic communications become more popular involves telefacsimile transmissions executed from computer to computer with no paper generation. A computer hard disk or other storage medium stores the received fax image, and a hard-copy printout is strictly optional. Though popular, telefacsimile transmissions represent data as images comprising dots or pixels arranged within the image to define the telefacsimile image, not as a string of, for example, American Standard Code for Information Interchange (ASCII) coded characters useful to word processors and the like.

In order to transform the images stored in electronic or hard-copy formats to ASCII or other coded character formats for use by word processing, database, or other coded character-based utilities, optical character recognition (OCR) processors translate electronic character images to a preferred character code format. The OCR processors scan the image to read the image characters and detect similarities to member characters of known, predetermined, character codes and output a reported character. The reported character is a prediction of what the image character read actually is. Preferably, the image or actual characters are read and reported in the same sequence as appearing on the scanned image, and the reported characters when assembled replicate the actual characters appearing in the scanned image. In the simplest optical character recognition systems, a single OCR processor or device reads the image and outputs a reported character or characters. However, due to various possible imperfections in the scanned image or the optical character recognition processor, the OCR processor may inaccurately report the characters read, introducing errors into the output coded text.

In order to increase the correlation between the read image characters and the reported characters, multiple OCR processors having various character recognition strengths and weaknesses may simultaneously or sequentially scan an identical image, and each OCR processor may in turn output a stream of reported characters corresponding to the actual characters read from the image. A post-read processor then aligns the reported character streams so that for each actual character scanned, a set of reported characters (one for each of the OCR processors) represents candidates for selection as representing the actual character read. Prior multiple OCR systems employed one of a variety of techniques to determine which character is most likely the actual character read. One technique relies on a majority-rule approach where the character most frequently reported by the OCR processors is output as the actual character read. Alternatively, because different OCR processors have different reporting accuracies, decisional algorithms weight the character reported by a particular OCR processor in accordance with an overall accuracy predetermined for each OCR processor. The weights for each reported character are then accumulated, and the reported character producing the greatest accumulated weight determines the character output by the multiple OCR system.

The above-mentioned systems do not consider that the accuracy of a particular OCR processor may depend upon the particular character read and reported by that OCR processor. In other words, it may be impractical and inaccurate to weight an OCR processor based on an overall rating. Thus, it is desirable to have a multiple OCR processor system which weights each OCR processor according to the particular reported character.

SUMMARY OF THE INVENTION

An image processing system for recognizing characters in a scanned image. The system includes a plurality of parallel optical character recognition (OCR) processors. Each OCR processor has individual character recognition capabilities for interpreting and reporting given characters which are read from the scanned image. A confusion matrix is stored for each OCR processor, the matrix being defined by a plurality of detection values, where each detection value is a function of the probability that a particular OCR processor accurately reports a particular character read from the image. The parallel OCR processors each generate a potential character candidate for each character read from the image, whereby the plurality of OCR processors generate a set of potential character candidates for each character that is read. Error processing means applies the confusion matrix for selected OCR processors to each potential candidate thereby to generate a character weight for each potential character candidate reported by the OCR processors. The error processing means further selects the potential character candidate having the highest weight as the character output of the system.

From the subsequent detailed description taken in conjunction with the accompanying drawings and subjoined claims, other objects and advantages of the present invention will become apparent to those skilled in the art.

DETAILED DESCRIPTION OF THE PREFERRED EMBODIMENTS

Figure 1:
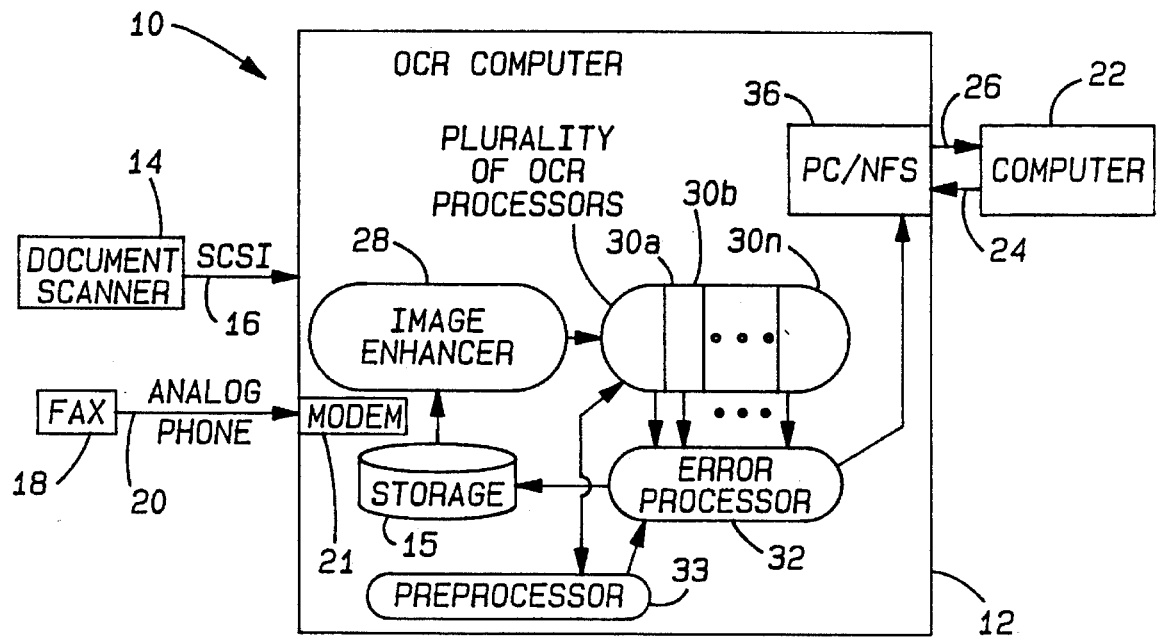
FIG. 1 is a block diagram of an optical character recognition system according to the present invention.

Referring to FIG. 1, the optical character recognition (OCR) system is shown and is generally referred to by reference numeral 10. The OCR system 10 includes OCR computer 12 which receives image data from peripheral devices such as document scanner 14, telefacsimile device (fax) 18, and computer 22 and stores the received image data in mass storage device 15. The peripheral devices are presented merely by way of example and are well known in the art. Document scanner 14 typically scans hard-copy or printed pages and generates an output image (or compressed version thereof) in which darkened pixels on the image represents text characters on the hard-copy or printed pages. The output image generated by document scanner 14 is transferred to OCR computer 12 via, for example, a small computer system interface 16 (SCSI). Similarly, fax 18 represents an incoming fax image input to OCR computer 12 over analog phone line 20. OCR computer 12 optionally includes a modem (shown diagrammatically as block 21) which attaches to analog phone line 20 for decoding the analog input signal received from fax 18 into a digital signal and also includes the appropriate software for interpreting the digital signals into an image stored in storage device 15. Computer 22 interconnects to OCR computer 12 and preferably represents an independently operating computer which optionally interconnects to OCR computer 12 using standard protocols known in the art. PC/NFS (personal computer/network file system) 36 represents such a standard communication protocol and enables communication between OCR computer 12 and computer 22. Computer 22 transmits either image or character data to OCR computer 12 on input line 24 and, optionally, OCR computer 12 may transmit either image or character data (such as ASCII data) to computer 22.

OCR computer 12 may be any of a number of computers known in the art and performs any of a number of functions depending on the particular program executing. Examples of OCR computer 12 include task-specific, stand-alone electronic devices, personal computers, larger micro-computers, and mainframe computers. Of particular importance is that OCR computer 12 executes preselected tasks or includes specifically designed circuitry to execute the optical character recognition function to be described subsequently. According to a preferred embodiment, OCR computer 12 is a standard IBM compatible personal computer. OCR computer 12 receives image data from one of the above-mentioned peripheral image generators, such as document scanner 14, fax 18, or computer 22, and typically stores the received image on a mass storage device 15 which in the preferred embodiment is a hard disk.

As a general overview, OCR computer 12 effects a weighted voting approach to multiple OCR processor optical character recognition by, optionally, first enhancing the image scanned by the OCR processors. An image enhancer 28 receives the stored image or images from mass storage device 15 and performs various enhancement routines to generate an image better suited for scanning by the subsequently executed OCR processes. The enhanced image is then input to multiple parallel OCR processors 30a–30n. The parallel OCR processors 30a–n, of which there are more than one and preferably several, simultaneously or sequentially read and perform optical character recognition on the enhanced image.

OCR parallel processors 30a–n preferably comprise commercial off-the-shelf (COTS) OCR processors, several of which are known in the art and will be detailed subsequently. Each OCR processor has particular strengths and weaknesses in recognizing specific characters appearing in the scanned image. When a character is recognized, the OCR processor outputs or reports the recognized character, typically in a character coded format such as American Standard Code for Information Interchange (ASCII) or Unicode. OCR system 10 exploits particular strengths and weaknesses of each OCR processor to recognize specific characters by quantifying the strengths and weaknesses and applying them to effect the weighted voting scheme to be described subsequently. Each OCR processor 30a–n reports or outputs a stream of characters corresponding approximately to each actual character in the scanned image. Thus, for each actual (or image) character in the scanned image, each OCR processor 30a–n outputs a reported character, to define a set of reported characters. One set of reported characters comprises the characters reported by each OCR processor 30a–n in response to reading one character in the image, and each character of the set is a candidate for output as the actual character. The sets of reported characters are then sequentially input to error processor 32 which executes a weighted voting scheme, to be described subsequently, according to the principles of this invention. For each set of reported characters, error processor 32 selects one character of each set as the actual character read.

In order for error processor 32 to select one candidate from the set of reported characters as the image (or actual) character read by OCR processors 30a–n, the recognitional tendencies of each OCR processor 30a–n must be quantified. That is, for each OCR processor 30a–n, a collection of characters exists which the OCR processor may recognize. For the collection of recognizable characters, a probability exists that the character reported by a particular OCR processor 30a–n is the actual character read. Such a probability exists for every possible combination of recognizable characters in the collection and defines a matrix, to be described subsequently. The matrix is called a confusion matrix, and one index into the matrix is characters read, and the other index to the matrix is the characters reported. To be explained subsequently, the cells of the confusion matrix contain probabilities that the character read by an OCR processor is the character reported by the OCR processor. Preprocessor 33 generates the above described confusion matrices. Preprocessor 33 applies a predetermined, known set of input images to OCR processors 30–n in order to quantify the tendencies of each OCR processor to better recognize particular characters appearing in a predetermined training set of images.

Figure 3:
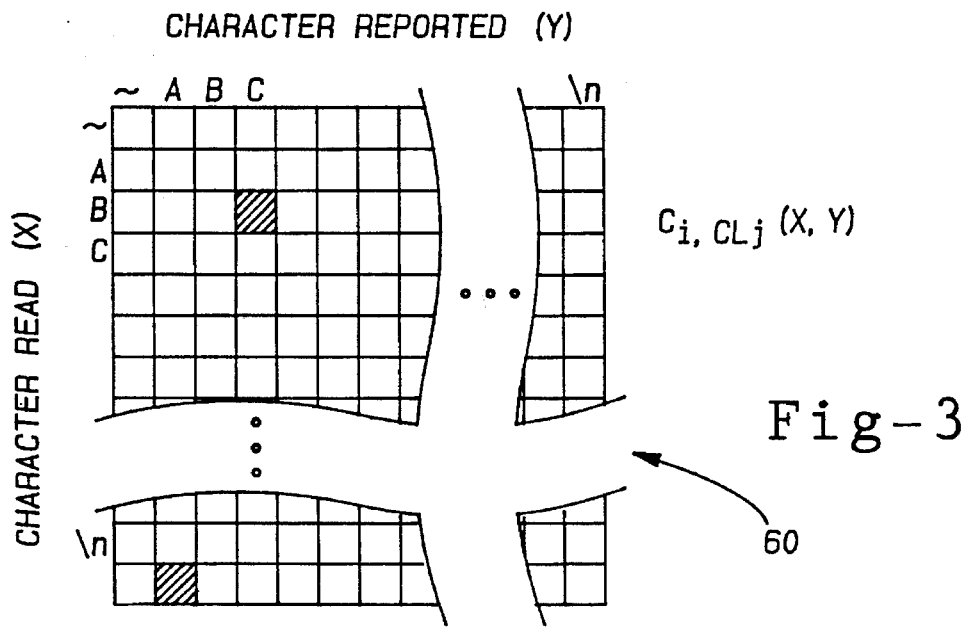
FIG. 3 is an example of a confusion matrix produced by the apparatus of FIG. 2.

FIG. 3 depicts a confusion matrix 60, which is merely an example of one confusion matrix. A confusion matrix stores for a particular OCR processor probabilities defining the likelihood that the OCR processor reports the reported character while reading the actual character. These probabilities exist for every possible pair of reported and read characters. Further, a confusion matrix exists for each OCR processor 30a–n. In an exemplary organization of confusion matrix 60, confusion matrix 60 is a N+1 row×N column sized matrix where N is equal to the number of possible characters recognizable by the OCR processors 30a–n. For example, if there are 128 characters in an ASCII character set, the confusion matrix will be 129 rows×128 columns. Row N+1 may be used to optionally accumulate the reporting of characters of each column. Note that for purposes of discussion, this specification refers to the ASCII character code, but it should be understood that any of a number of coded character conventions could be readily substituted for ASCII.

Referring to confusion matrix 60 depicted in FIG. 3, the rows (X) represent the character actually read by an OCR processor, and each column (Y) represents a particular character reported by an OCR processor associated with confusion matrix 60. In the preferred embodiment there is at least one confusion matrix $C_{i,CL_j}(X,Y)$ for each OCR processor 30a–n. Subscript i denotes the particular OCR processor 30a–n to which confusion matrix 60 corresponds, and subscript CLj denotes a confidence level which may be optionally associated with a particular OCR processor. With respect to confidence levels CLj, some OCR processors not only report a character, but also report additional information defined as a confidence level. A confidence level reported by an OCR processor is in effect a self-evaluation by the OCR processor as to the accuracy of the character reported. For OCR processors which report a confidence level, they typically do so only with reported characters for which the confidence is not high. If an OCR processor reports a character with no confidence level, then the confidence level of this character is said to be one level higher than the highest level that the OCR processor reports.

The confidence level reported by each OCR processor depends on the particular OCR processor. For example, some OCR processors report confidence levels in a binary form where one binary value implies a high confidence and the compliment of the one binary value implies a low confidence. Alternatively, some OCR processors report confidence levels in a range of 0 to 999 with one end of the range being a high confidence and the other end of the range being a low confidence. For the subscript CLj, the j represents the particular confidence level reported, i.e., where an OCR processor reports binary confidences, j would be either 0 or 1. Further, where OCR processors report confidence levels in addition to reported characters, the range of reported confidences, if relatively expansive, may be quantized into a smaller range of confidence levels to facilitate maintaining the confusion matrices. For example, if an OCR processor reports confidence levels within the range of 0 to 999, the range may be quantized into ten intervals having ranges 0–99, 100–199, etc.

Figure 2:
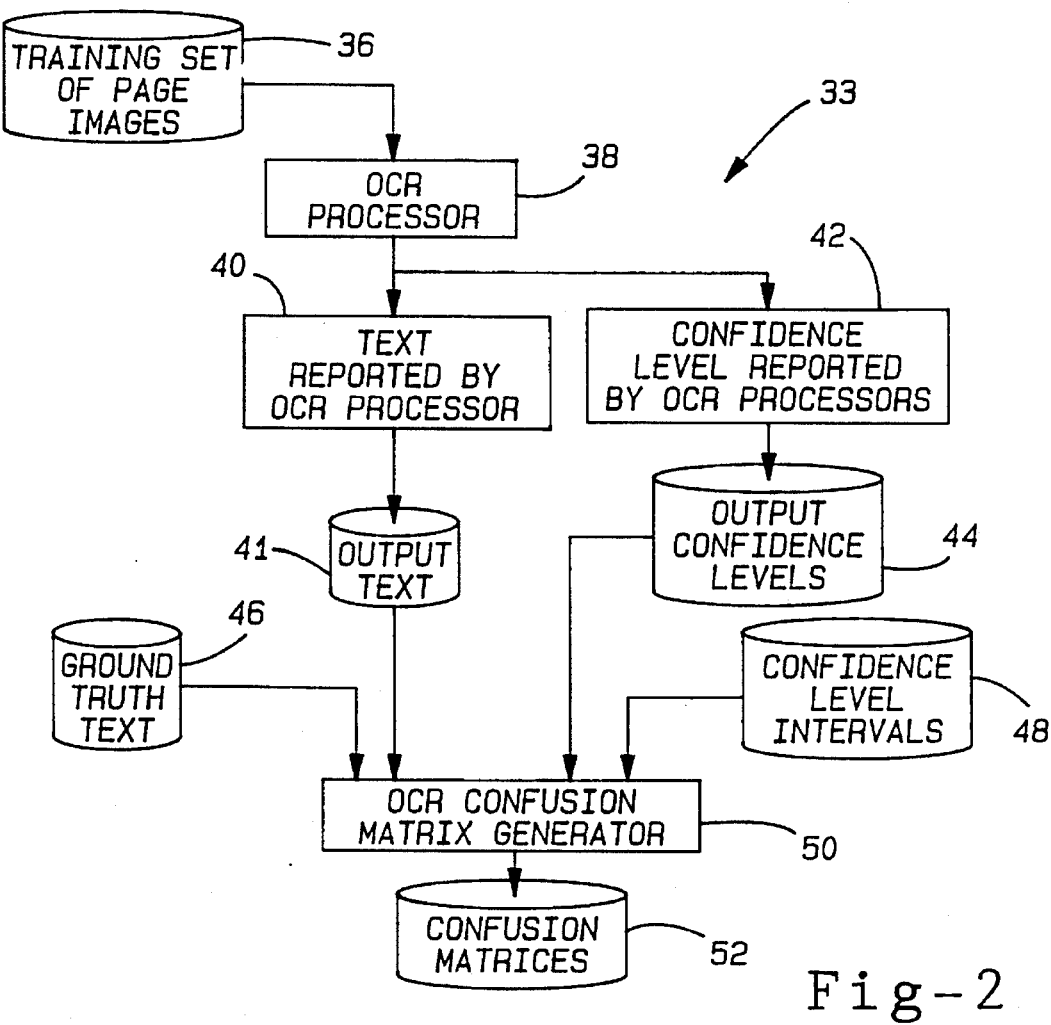
FIG. 2 is a block diagram of an apparatus for developing confusion matrices according to the present invention.

Referring to FIG. 2, an expanded block diagram of preprocessor 33 depicts generating a confusion matrix $C_{i,CLj}(X, Y)$ for one OCR processor such as shown in FIG. 3. Preprocessor 33 generates for each OCR processor at least one confusion matrix as depicted in FIG. 3 and possibly a number of confusion matrices, depending on the range of confidence levels reported by an OCR processor. In operation, an OCR processor 38 receives a training set of page images 36 stored on hard disk (mass storage device 15, for example). In FIG. 2 OCR processor 38 represents any one of parallel OCR processors 30a–n. The OCR processor 38 scans the training set of page images and reports the characters read. The reported characters are coded text 40 (ASCII, for example) and is stored in mass storage 41. OCR processor 38, as described previously, may also output confidence levels 42 corresponding to each recognized character and indicating the confidence level that each reported character output is the actual character read by the OCR processor. The confidence levels 42 are stored in mass storage 44.

Confusion matrix generator 50 generates confusion matrix 52 in accordance with the actual or ground truth text 46, output text 41, output confidence levels 44, and character confidence intervals 48, all of which may be stored in mass storage as shown. Ground truth text 41 represents an exact translation of characters as they appear on the training set of page images 36. If an OCR processor effects an exact translation of the training set of page images 36, output text 46 and ground truth text 46 would be identical. Confusion matrix generator 50 generates confusion matrix 52, in the simplest scenario (no confidence levels are produced), by comparing output text 41 with ground truth text 46.

Confusion matrix 60 is first initialized with zero in each cell. Confusion matrix 52 is generated by comparing output text 41 with ground truth text 46 on a character by character basis. For each character of ground truth text 46, there corresponds a character in output text 41. Referring to confusion matrix 60 of FIG. 3, the contents of the cell defined by the character read and the character reported is incremented. For example, assuming that for OCR processor 2, the character read is a D but the character reported is a V, confusion matrix cell $C_{2,CLx}(D,V)$ is incremented (assuming that the confidence level is x). In a more complicated scenario where OCR processor 38 reports confidence levels as well, confusion matrix generator 50 quantizes the output confidence levels 44 into the ranges provided by confidence level intervals 48 and generates a number of confusion matrices $C_{i,CL1}(X,Y)$, $C_{i,CL2}(X,Y)$, ..., $C_{i,CLa}(X,Y)$ (where a equals the number of intervals). Thus when an output confidence level 44 is reported, the confusion matrix corresponding to the reported output confidence level will be modified. The confusion matrix is then modified as described above where the cell defined by the character reported and the character read is incremented. This process is repeated for each character of output text 41.

Further, confusion matrix generator 50 first aligns the output text 41 and the ground truth text 46 so that the proper actual and reported characters are compared. Normally, the numbers of characters in the ground truth text 46 and output text 41 are equal. When the number of characters in the ground truth text and the reported text do not correspond, nil characters fill blank spaces to enable substantial synchronization between the two strings of output 41 and ground truth 46 text. Such synchronization techniques are well known in the art.

As described previously, in order to generate confusion matrix $C_{i,CLj}(X,Y)$, for the ith OCR processor at the jth confidence level, for each occurrence in the synchronized strings (a,b), the contents of matrix cell of $C_{i,CLj}(a,b)$ is incremented by 1. Each confusion matrix $C_{i,CLj}(X, Y)$ thus tracks the number of occurrences of reported versus actual or image characters in order to define the behavior of a particular OCR. The occurrences are then transformed into probabilities by normalizing columns of each matrix in accordance with the following equation:

$$C_{i,CLj}(X,Y) = \frac{C_{i,CLj}(X,Y)}{\sum_X C_{i,CLj}(X,Y)} \qquad (1)$$

When $\Sigma_x$ means the summation over all characters X. Once the confusion matrices have been generated, OCR computer 12 can activate error processor 32 as depicted in an expanded block diagram of FIG. 4.

Figure 4:
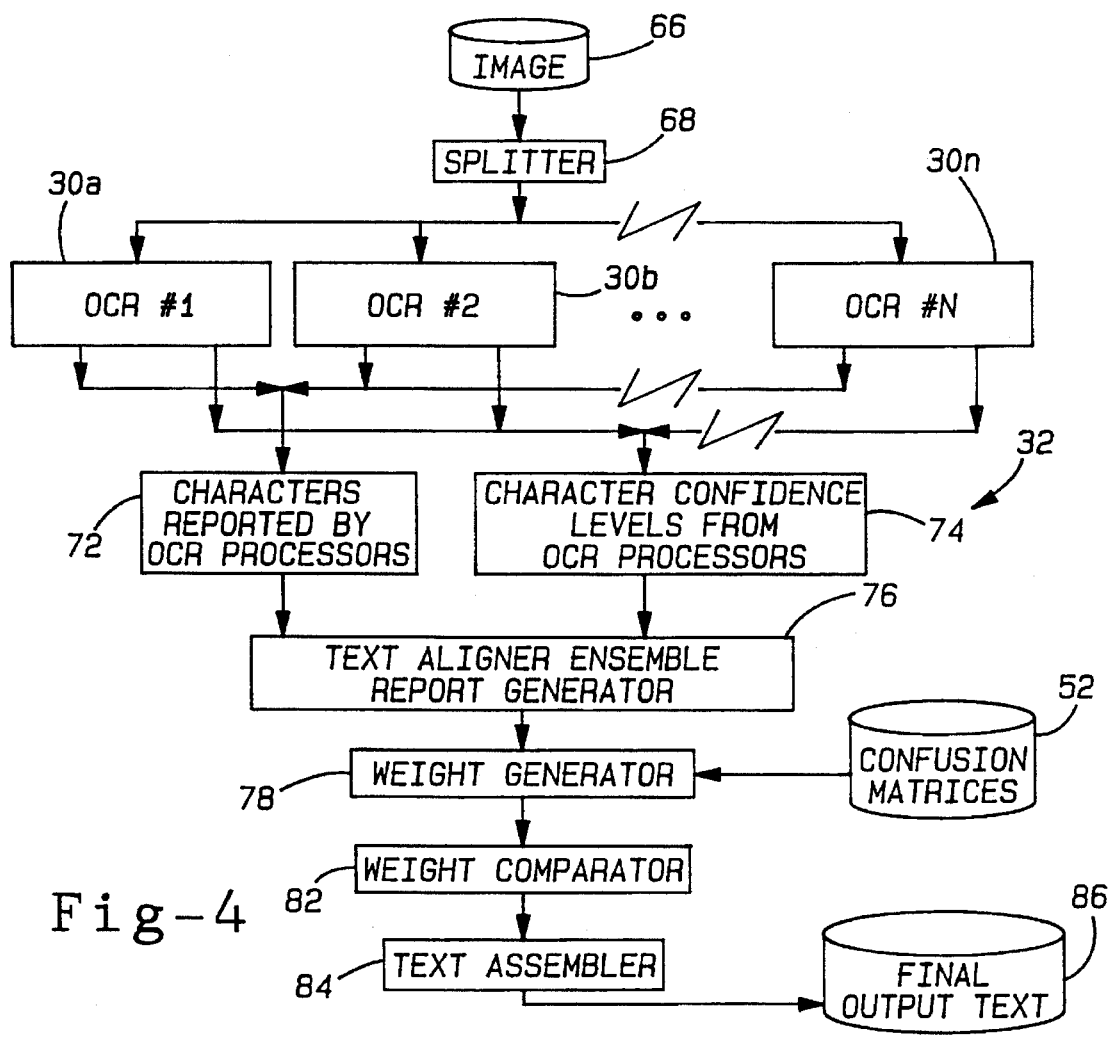
FIG. 4 is a detailed block diagram of an implementation of the optical character recognition system according to the principles of this invention.

Referring to FIG. 4, operation of error processor 32 will be described in detail. Splitter 68 receives an enhanced image 66 as may be output by image enhancer 28. Splitter 68 distributes the same enhanced image to the OCR processors 30a, 30b, ..., 30n, as shown in FIG. 1 also. OCR processors 30a–n each output reported characters in accordance with characters read from image 66. OCR processors 30a–n include at least two differing OCR processors any number of which are known in the art and which may include TEXTBRIDGE API, WORDSCAN PLUS, OMNIPAGE PROFESSIONAL, RECORE, RECOGNITA PLUS, AND RECOGNITION TOOLKIT. Output 72 from OCR processors 30a–n includes the reported text characters in a character coded format (ASCII), and output 74 from OCR processors 30a–n includes character confidence levels. Text aligner and ensemble report generator 76 receives the reported characters 72 and character confidence levels 74 and aligns reported characters and confidence intervals, as described previously with respect to FIG. 2, in order to generate an ensemble report. The ensemble report includes for each character a set R of ordered pairs, one for each of the n OCR processors, of the form $(Y_i, CL_i)$ (i=1 ... n) indicating that OCR i reported character Y at a confidence level $CL_i$. The ordered pairs are grouped in a set according to the form $$R=[<y_1, CL_1>,<y_2, CL_2>, \ldots, <y_n, CL_n>] \quad (2)$$

Weight generator 78 receives the ensemble reports and generates weights in accordance with probabilities based on data obtained from confusion matrices 52 (from FIG. 2 generated by preprocessor 33) stored in mass storage. These weights Wy are determined for a subset of the set of actual characters in accordance with the equation:

$$Wy = \frac{\prod_{i=1}^{n} (C_{i,CL_i}(y,y_i))}{\sum_{X}\left[\prod_{i=1}^{n} (C_{i,CL_i}(X,y_i))\right]} \quad (3)$$

When y is a representative element of the subset. The method for choosing the subset may vary as described below and may consist, for example, of all actual characters or of only those characters reported by at least one OCR.

Note that with respect to Equation (3), because the denominator does not change as y varies, the denominator of Equation (3) is constant so long as the confusion matrices do not change. Alternatively, the denominator of Equation (3) may be a fixed value, preferably 1, to simplify the calculation. Note that, as will be described, the number of weights Wy calculated depends upon the particular weighting scheme used. Weight generator 78 generates one or a number of weights in accordance with equation (3), and weight comparator 82 compares the weights generated by weight generator 78. The y producing the greatest weight Wy is chosen as the best estimate for the actual scanned character. The y corresponding to the greatest Wy output by weight comparator 82 is input to text assembler 84 which assembles text. Text assembler 84 then generates the final output text 86 stored in mass storage on OCR computer 12.

Weight generator 78 applies equation (3) to generate weights in accordance with the set of ordered pairs R corresponding to a particular set of reported characters. Selecting which of a number of Y's for which to determine weights Wy in accordance with equation (3) depends on the particular protocol chosen for implementation. The protocol options are as follows:

1. For every ordered pair of the ensemble report R, calculate a weight Wy for every character y;
2. For every ensemble report R reporting two different characters, calculate a weight Wy for every character y;
3. For every ensemble report R reporting at least two different characters $y_1, \ldots, y_n$, for each reported character appearing in the ensemble report, calculate a weight $Wy_m$ where m=1 ... n; and
4. For every ensemble report having at least two characters reported an equal, maximum number of times, for each character reported an equal, maximum number of times, calculate a weight.

Preferably, OCR computer 12 employs the third or fourth protocol as mentioned above to estimate the actual character. The third and fourth protocol are preferable because they reduce the number of calculations needed to determine an estimate for the actual character.

Thus, OCR computer 12 chooses which reported character most likely represents the character scanned in accordance with the recognitional tendencies of particular OCR processors. A test set of known characters undergoes interpretation by the OCR processors in order to generate confusion matrices. The confusion matrices provide probabilities and increase the likelihood of correctly determining the scanned character because the characters appearing in the ensemble report are weighted in accordance with the predetermined characteristics of each particular OCR processor. Thus, OCR processors determined to be more accurate in reporting certain characters generally are accorded authority in determining the actual character scanned.

Although the invention has been described with particular reference to certain preferred embodiments thereof, variations and modifications can be effected within the spirit and scope of the following claims.

What is claimed is:

1. An image processing system for recognizing characters in a scanned image, said system comprising:

a plurality of parallel optical character recognition (OCR) processors, each OCR processor having individual character recognition capabilities for interpreting and reporting given characters in the scanned image;

confusion matrix storage means for storing a plurality of matrices each corresponding to one of the plurality of OCR processors, each of said matrices being defined by a plurality of detection values, each detection value being a function of the probability that a particular character in the image will cause the OCR processor associated with the matrix to report a particular candidate;

said parallel OCR processors each reporting a potential character candidate for each character read from the image, whereby the plurality of OCR processors generate a set of potential character candidates for each character that is read; and error processing means for:
   a. generating character weights for the potential character candidates reported by selected OCR processors in accordance with a plurality of detection values from at least one confusion matrix based upon the reported potential character candidates; and
   b. choosing the potential character candidate having the highest weight as the character recognition output of the system.

2. The apparatus as defined in claim 1 wherein said confusion matrix further comprises:

a first index including all characters that can possibly be read by said OCR processor;

a second index including all characters that can possibly be reported by said OCR processor;

whereby a particular reported character of said first index and a particular read character of said second index reference a position in said matrix in which is stored a detection value which defines the probability that said particular reported character is said particular character read.

3. The apparatus as defined in claim 2 further comprising:

a preprocessor, for generating a confusion matrix for each OCR processor said processor including:
   a. output text storage means for storing characters reported by said OCR processor, where said OCR processor outputs said reported characters after scanning an image having a test set of characters; and
   b. means for generating the detection values of said confusion matrix by comparing characters reported by said OCR processor with ground truth text characters, said ground truth text characters representing an exact reporting of said scanned image.

4. The apparatus as defined in claim 3 wherein the means for generating said confusion matrix increments the cell defined by said reported character and said ground truth character, said ground truth character corresponding to said first index and said reported character corresponding to said second index.

5. The apparatus as defined in claim 4 wherein said means for generating said confusion matrix normalizes the number of occurrences of said reported characters for each of said reported characters.

6. The apparatus as defined in claim 2 wherein at least one of said plurality of OCR processors outputs with each reported character a confidence level defining the confidence with which said reported character is accurately reported.

7. The apparatus as defined in claim 6 wherein said confusion matrix further comprises a third index including all possible confidence levels for said OCR processor, whereby a particular read character of said first index, a particular reported character of said second index, and a particular confidence level of said third index reference a position in said matrix in which is stored a detection value which defines the probability that said particular reported character is said particular character read at a particular confidence level.

8. The apparatus as defined in claim 1 wherein said error processing means applies a plurality of said detection values of said confusion matrix to said potential character candidate to weight potential character candidates, said plurality of detection values chosen in accordance with the potential candidate.

9. The apparatus as defined in claim 8 wherein said error processing means multiplies each of said plurality of detection values to yield said weight for said potential character candidate.

10. The apparatus as defined in claim 1, wherein said optical character recognition processors are arranged in a parallel configuration.

11. A method for recognizing characters in a scanned image, said method comprising:

providing a plurality of optical character recognition (OCR) processors, each OCR processor having individual character recognition capabilities for interpreting and reporting given characters in the scanned image;

generating a plurality of confusion matrices each corresponding to one of the plurality of OCR processors, each of said matrices being defined by a plurality of detection values, each detection value being a function of the probability that a particular character in the image will cause the OCR processor associated with the matrix to report a particular candidate;

reporting a potential character candidate for each character read from the image for each OCR processor, whereby the plurality of OCR processors generate a set of potential character candidates for each character that is read;

generating character weights for the potential character candidates reported by selected OCR processors in accordance with a plurality of detection values from at least one confusion matrix based upon the reported potential character candidates; and choosing the potential character candidate having the highest weight as the character recognition output of the system.

12. The method as defined in claim 11 wherein said step of generating said confusion matrix further comprises:

providing a first index including all characters that can possibly be read by said OCR processor;

providing a second index including all characters that can possibly be reported by said OCR processor;

whereby a particular read character of said first index and a particular reported character of said second index reference a position in said matrix in which is stored a detection value which defines the probability that said particular reported character is said particular character read.

13. The method as defined in claim 12 wherein said step of generating said confusion matrix for each OCR processor further comprises:

storing characters reported by said OCR processor as output text, where said OCR processor outputs said reported characters after scanning an image having a test set of characters; and generating the detection values of said confusion matrix by comparing characters reported by said OCR processor with ground truth text characters, said ground truth text characters representing an exact reporting of said scanned image.

14. The method as defined in claim 13 wherein the step generating said confusion matrix further comprises incrementing the cell defined by said reported character and said ground truth character, said ground truth character corresponding to said first index and said reported character corresponding to said second index.

15. The method as defined in claim 14 wherein said means for generating said confusion matrix further comprises normalizing the number of occurrences of said reported characters for each of said reported characters.

16. The method as defined in claim 12 wherein at least one of said plurality of OCR processors outputs with each reported character a confidence level defining the confidence with which said reported character is accurately reported.

17. The method as defined in claim 16 wherein the step of generating said confusion matrix further comprises providing a third index including all possible confidence levels for said OCR processor, whereby a particular read character of said first index, a particular reported character of said second index, and a particular confidence level of said third index reference a position in said matrix in which is stored a detection value which defines the probability that said particular reported character is said particular character read at a particular confidence level.

18. The method as defined in claim 11 wherein said step of determining said character weight further comprises applying a plurality of said detection values of said confusion matrix to said potential character candidate to weight potential character candidates, said plurality of detection values chosen in accordance with the potential candidate.

19. The method as defined in claim 18 wherein said step of determining said character weight further comprises multiplying each of said plurality of detection values to yield said weight for said potential character candidate.

20. An image processing system for recognizing characters in a scanned image, said system comprising:

a device for receiving data input thereto and outputting an electronic image in a predetermined format;

processing means for receiving said electronic image, said processing means including:

a plurality of optical character recognition (OCR) processors, each OCR processor having individual character recognition capabilities for interpreting and reporting given characters in the scanned image;

confusion matrix storage means for storing a plurality of matrices each corresponding to one of the plurality of OCR processors, each of said matrices being defined by a plurality of detection values, each detection value being a function of the probability that a particular character in the image will cause the OCR associated with the matrix to report a particular candidate;

said OCR processors each normally reporting a potential character candidate for each character read from the image, whereby the plurality of OCR processors generate a set of potential character candidates for each character that is read; and error processing means for:
 a. generating character weights for the potential character candidates reported by selected OCR processors in accordance with a plurality of detection values from at least one confusion matrix based upon the reported potential character candidates; and
 b. choosing the potential character candidate having the highest weight as the character recognition output of the system.

21. The apparatus as defined in claim 20 wherein said device for receiving data comprises a telefacsimile machine.

22. The apparatus as defined in claim 20 wherein said device for receiving data comprises a document scanner.

23. The apparatus as defined in claim 20 wherein said processor is a computer.

24. The apparatus as defined in claim 20, wherein said OCR processors are arranged in a parallel configuration.

* * * * *